United States Patent
Lee et al.

(10) Patent No.: US 11,190,057 B2
(45) Date of Patent: *Nov. 30, 2021

(54) APPARATUS FOR TRANSMITTING WIRELESS POWER FOR MULTIPLE SIMULTANEOUS CHARGING AND APPARATUS FOR RECEIVING WIRELESS POWER

(71) Applicant: INDUSTRY-ACADEMIC COOPERATION FOUNDATION, YONSEI UNIVERSITY, Seoul (KR)

(72) Inventors: Yongshik Lee, Seoul (KR); Taejun Lim, Tongyeong-si (KR); Jaemin Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 199 days.

This patent is subject to a terminal disclaimer.

(21) Appl. No.: 16/199,085

(22) Filed: Nov. 23, 2018

(65) Prior Publication Data

US 2019/0165616 A1    May 30, 2019

(30) Foreign Application Priority Data

Nov. 29, 2017    (KR) ........................ 10-2017-0161179

(51) Int. Cl.
*H02J 50/40*    (2016.01)
*H02J 50/12*    (2016.01)
(Continued)

(52) U.S. Cl.
CPC .............. *H02J 50/40* (2016.02); *H02J 50/12* (2016.02); *H02J 50/50* (2016.02); *H02J 50/80* (2016.02); *H02J 50/90* (2016.02)

(58) Field of Classification Search
CPC .. H02J 50/12; H02J 50/50; H02J 50/90; H02J 50/40; H02J 50/10; H03H 2001/0057; H03H 1/00
See application file for complete search history.

(56) References Cited

U.S. PATENT DOCUMENTS

| 2015/0115729 A1* | 4/2015 | Kanno | ................... H02J 50/80 307/104 |
| 2015/0115730 A1* | 4/2015 | Kanno | ................... H02J 50/00 307/104 |

(Continued)

FOREIGN PATENT DOCUMENTS

| JP | 2015-111997 A | 6/2015 |
| KR | 10-2012-0124732 A | 11/2012 |

(Continued)

*Primary Examiner* — Rexford N Barnie
*Assistant Examiner* — Elim Ortiz

(57) ABSTRACT

A wireless power transmission apparatus for multiple simultaneous charging is disclosed. The disclosed apparatus, which may be a wireless power transmission apparatus configured to provide charging power simultaneously to a multiple number of wireless power reception apparatuses, may include: a driving coil configured to transmit wireless power; a magnetic coupler inductively coupled with the driving coil; and a resonance frequency adjustment part configured to adjust a resonance frequency of the magnetic coupler, where the magnetic coupler includes a multiple number of coils, and a variable capacitor is joined to each of the multiple coils. The disclosed apparatus can improve power transfer efficiency while providing power simultaneously to a multiple number of wireless power reception apparatuses.

11 Claims, 6 Drawing Sheets

(51) Int. Cl.
    *H02J 50/80*     (2016.01)
    *H02J 50/90*     (2016.01)
    *H02J 50/50*     (2016.01)

(56) References Cited

U.S. PATENT DOCUMENTS

| | | | |
|---|---|---|---|
| 2016/0033254 A1* | 2/2016 | Zeine | H02J 50/80 307/104 |
| 2016/0211704 A1* | 7/2016 | Uchida | H02J 50/12 |

FOREIGN PATENT DOCUMENTS

| | | |
|---|---|---|
| KR | 10-2013-0098963 A | 9/2013 |
| KR | 10-2015-0017807 A | 2/2015 |
| KR | 10-2016-0019976 A | 2/2016 |
| WO | 2015-045160 A1 | 4/2015 |

\* cited by examiner

APPARATUS FOR TRANSMITTING WIRELESS POWER FOR MULTIPLE SIMULTANEOUS CHARGING AND APPARATUS FOR RECEIVING WIRELESS POWER

CROSS-REFERENCE TO RELATED APPLICATIONS

This application claims the benefit of Korean Patent Application No. 10-2017-0161179, filed with the Korean Intellectual Property Office on Nov. 29, 2017, the disclosure of which is incorporated herein by reference in its entirety.

BACKGROUND

1. Technical Field

Embodiments of the present invention relate to a wireless power transmission apparatus, more particularly to a wireless power transmission apparatus for multiple simultaneous charging and a wireless power reception apparatus.

2. Description of the Related Art

Wireless power transmission is a field receiving much attention, in step with growing interest in recent times in energy ubiquitous technology. In particular, research is under way on the wireless power transmission system using magnetic resonance, with efforts focusing on increasing transfer efficiency such as by inserting an additional structure between the apparatuses transmitting and receiving power.

In existing wireless power transmission apparatuses, the efficiency of the power transfer was largely dependent on the aligned state between the wireless power transmission apparatus and the wireless power reception apparatus. There was the problem that, whereas a satisfactory level of power transfer efficiency is provided when the wireless power transmission apparatus and the wireless power reception apparatus are suitably aligned, the power transfer efficiency dropped significantly when the aligned state was just a little askew.

Currently, there are also research and development efforts focusing on multiple simultaneous charging, which involves simultaneously charging a multiple number of wireless power reception apparatuses with a single wireless power transmission apparatus.

When a single wireless power transmission apparatus charges multiple wireless power reception apparatuses simultaneously in this manner, misalignment inevitably occurs between the driving coil of the wireless power transmission apparatus and the receiving coil of the wireless power reception apparatuses. As such, deviations in the charging efficiencies of the simultaneously charged wireless power reception apparatuses are unavoidably increased, and the overall charging efficiency is also lowered.

Moreover, as multiple wireless power reception apparatuses receive power simultaneously, interference may occur between the receiving coils, further lowering the charging efficiency.

SUMMARY OF THE INVENTION

An aspect of the present invention provides a wireless power transmission apparatus that can improve power transfer efficiency while providing power to multiple wireless power reception apparatuses simultaneously.

Also, an objective of the present invention is to provide a wireless power transmission apparatus that can provide adequate levels of power transfer efficiency even when there is misalignment due to horizontal deviations between the wireless power transmission apparatus and the multiple wireless power reception apparatuses.

Also, an objective of the present invention is to provide a wireless power transmission apparatus that can maintain efficiency even when power is distributed non-uniformly according to the battery capacities and current battery states, etc., of the multiple wireless power reception apparatuses.

An aspect of the present invention provides a wireless power transmission apparatus that is configured to provide charging power simultaneously to a multiple number of wireless power reception apparatuses and includes: a driving coil configured to transmit wireless power; a magnetic coupler inductively coupled with the driving coil; and a resonance frequency adjustment part configured to adjust a resonance frequency of the magnetic coupler, where the magnetic coupler includes a multiple number of coils, and a variable capacitor is joined to each of the multiple coils.

The number of coils included in the magnetic coupler may be based on the number of wireless power reception apparatuses that can be charged simultaneously.

A sensor part may be further included, which may be configured to detect the position and the direction of the multiple wireless power reception apparatuses based on information provided from the multiple wireless power reception apparatuses, where the resonance frequency adjustment part may adjust the resonance frequency based on the position and direction detected by the sensor part.

The information provided from the wireless power reception apparatuses may include reception power information.

The magnetic coupler may be arranged separated from the driving coil, and the multiple number of coils may be arranged on the same plane.

The variable capacitor may include a varactor diode.

The resonance frequency adjustment part may adjust the capacitance of a particular variable capacitor from among the variable capacitors based on the detection information of the sensor part.

Another aspect of the present invention provides a wireless power transmission apparatus that is configured to provide charging power simultaneously to a multiple number of wireless power reception apparatuses and includes: a driving coil configured to transmit wireless power; a magnetic coupler inductively coupled with the driving coil; and a resonance frequency adjustment part configured to adjust a resonance frequency of the magnetic coupler, where the magnetic coupler includes a multiple number of coils, and the number of coils included in the magnetic coupler is based on the number of wireless power reception apparatuses that can be charged simultaneously.

Still another aspect of the present invention provides a wireless power reception apparatus that includes: a driving coil configured to receive wireless power from a wireless power transmission apparatus; a first magnetic coupler inductively coupled with the driving coil; and a first resonance frequency adjustment part configured to adjust a resonance frequency of the first magnetic coupler, where the first magnetic coupler includes a multiple number of coils, a variable capacitor is joined to each of the multiple coils, the wireless power transmission apparatus includes a second magnetic coupler, which includes a multiple number of coils, and a second resonance frequency adjustment part, which is configured to adjust a resonance frequency of the coils included in the second magnetic coupler, and the wireless power transmission apparatus is configured to simultaneously charge a multiple number of wireless power reception apparatuses.

A wireless power transmission apparatus according to an embodiment of the present invention can improve power transfer efficiency while providing power simultaneously to a multiple number of wireless power reception apparatuses, and moreover, can maintain efficiency even when distributing power non-uniformly according to the battery capacities and current battery states, etc., of the multiple wireless power reception apparatuses.

DETAILED DESCRIPTION OF THE INVENTION

Figure 1:
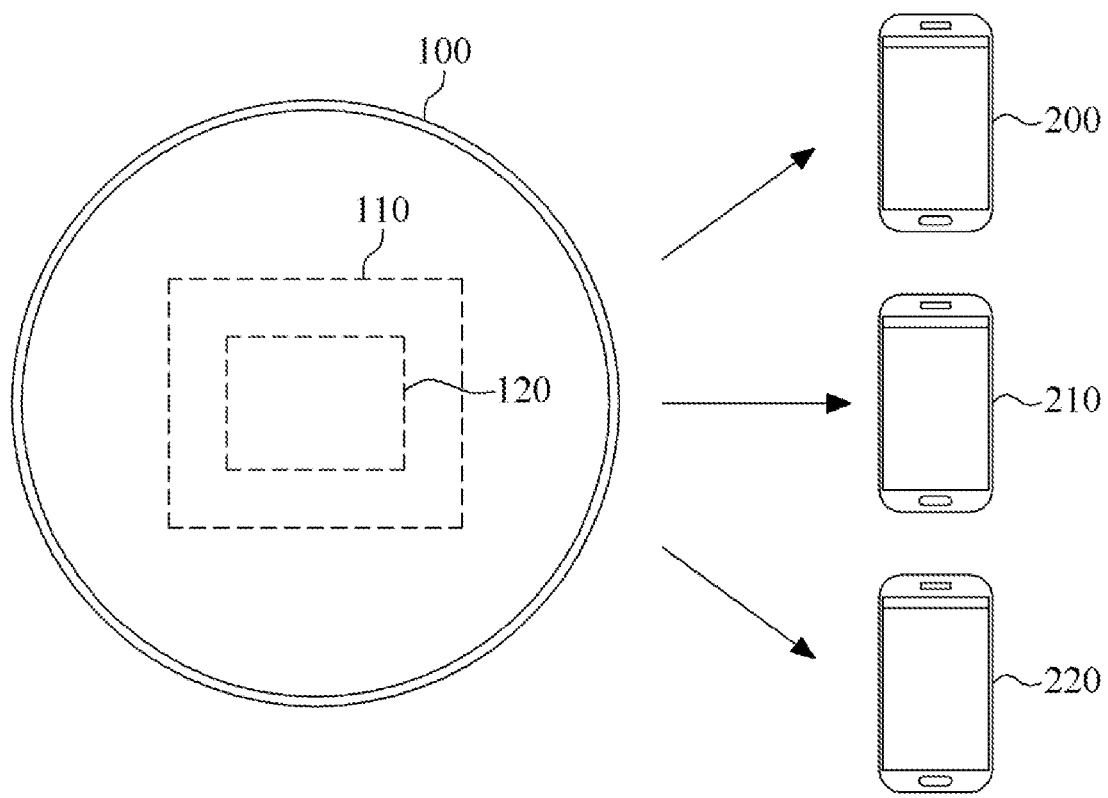
FIG. 1 illustrates a wireless power transfer system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, similar reference numerals are used for similar elements.

Certain embodiments of the present invention are described below in further detail with reference to the accompanying drawings.

FIG. 1 illustrates a wireless power transfer system according to an embodiment of the present invention.

Referring to FIG. 1, a wireless power transfer system according to an embodiment of the present invention may include a wireless power transmission apparatus 100 and a multiple number of wireless power reception apparatuses 200, 210, 220.

The wireless power transmission apparatus 100 may be an apparatus for providing power to various electronic devices, including mobile phones, and the wireless power reception apparatuses 200, 210, 220 may be apparatuses that receive power from the wireless power transmission apparatus 100, a typical example of a wireless power reception apparatus being a mobile phone.

A wireless power transmission apparatus 100 based on an embodiment of the present invention may provide the functionality by which a single transmission apparatus simultaneously charges multiple wireless power reception apparatuses 200, 210, 220. Since, in this case, it is impossible to have all of the wireless power reception apparatuses placed in the center of the driving coil, the problem of misalignment between the wireless power transmission apparatus 100 and the wireless power reception apparatuses 200, 210, 220 inevitably occurs. While FIG. 1 illustrates three wireless power reception apparatuses 200, 210, 220, it should be apparent to the skilled person that the number of wireless power reception apparatuses may vary.

A wireless power transmission apparatus 100 according to an embodiment of the present invention may include a driving coil 110 and a magnetic coupler 120. The driving coil 110 may serve as a radiator that transmits wireless power, and the magnetic coupler 120 may be separated by a particular distance from the driving coil 110 to be inductively coupled to the driving coil. The magnetic coupler 120 may be composed of a multiple number of coils, where the detailed structure of the magnetic coupler 120 will be described with reference to a separate drawing.

In the magnetic coupler 120 that includes a multiple number of coils, a variable capacitor may be applied to each of the coils. The variable capacitors are components for enabling efficient power transfer to the multiple number of wireless power reception apparatuses 200, 210, 220, which are unavoidably arranged in a misaligned state. The variable capacitor may be joined to the respective coil to modify the resonance frequency of each of the coils forming the magnetic coupler as necessary.

Various known types of capacitors can be used for the variable capacitors, an example of which can include the varactor diode.

The variable capacitors can also be implemented by a multiple number of switchable fixed capacitors. For example, multiple fixed capacitors may be connected to a coil, after which the overall capacitance may be adjusted by way of switching the fixed capacitors.

It would also be possible to apply a structure that combines a general variable capacitor (varactor diode) with a multiple number of switchable fixed capacitors.

It should be apparent to the skilled person that adjusting the capacitance can be implemented using various methods other than the methods above.

The multiple number of wireless power reception apparatuses 200, 210, 220 may also include driving coils, where a driving coil in a wireless power reception apparatus may serve as a radiator that receives the power provided from the transmission apparatus.

Figure 2:
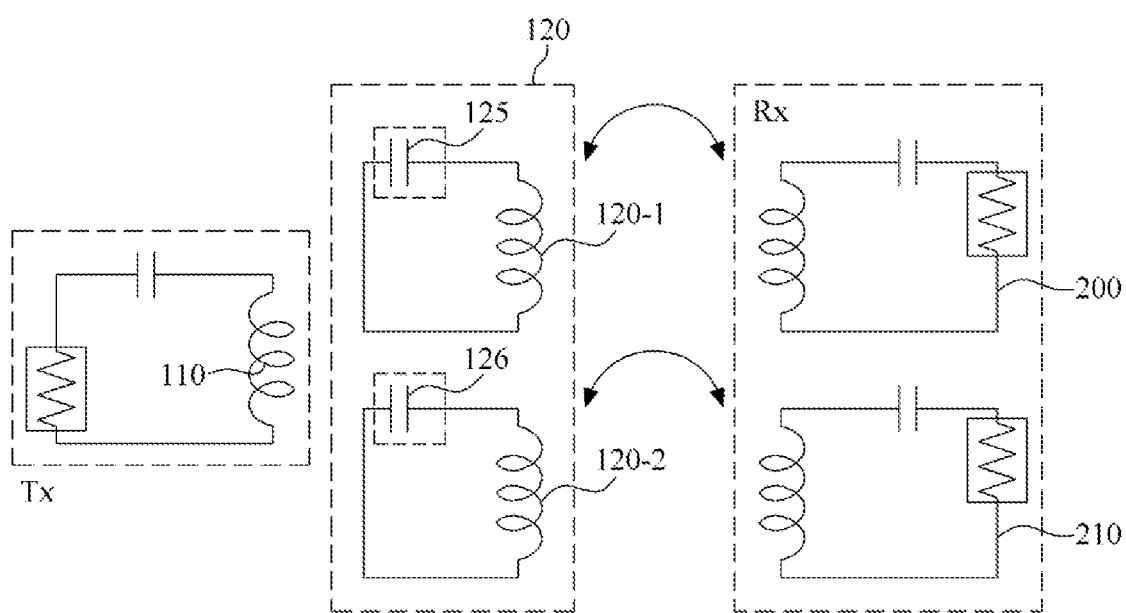
FIG. 2 illustrates the structures of a wireless power transmission apparatus and wireless power reception apparatuses according to an embodiment of the present invention as represented in the form of circuits.

FIG. 2 illustrates the structures of a wireless power transmission apparatus and wireless power reception apparatuses according to an embodiment of the present invention as represented in the form of circuits.

Referring to FIG. 2, power signals transmitted via the driving coil 110 may be inductively coupled to the multiple number of coils 120-1, 120-2 forming the magnetic coupler 120, and the power signals may be provided to the multiple number of wireless power reception apparatuses 200, 210 via the magnetic coupler 120.

Although it is not illustrated in FIG. 2, a matching network may be included in a wireless power reception apparatus 200, 210, and the related art uses a method of improving power reception efficiency by adjusting the value of a reactive component (capacitor or inductor) in each matching network. With such method, however, it is difficult to fundamentally resolve the problem of lowered power efficiency resulting from misalignment, and changes in impedance may lead to other problems.

An embodiment of the present invention performs the charging for multiple wireless power apparatuses by using a magnetic coupler 120 composed of multiple coils. Here, the number of coils forming the magnetic coupler can be determined based on the number of wireless power charged apparatuses charged simultaneously, but the present is not limited thus.

As illustrated in FIG. 2, each coil 120-1, 120-2 forming the magnetic coupler 120 may have a variable capacitor 125, 126 joined thereto. As the magnetic coupler 120 includes a multiple number of coils, the magnetic signals generated at the coils can be augmented or suppressed at specific points. As the resonance frequencies are changed by way of the variable capacitors 125, 126, the intensities of the magnetic signals can be adjusted, and this can be used to allow efficient power transfer even in a misaligned state.

While the variable capacitors 125, 126 can be connected to the respective coils in series as illustrated in FIG. 2, any method of connection can be employed as long as the arrangement is capable of modifying the resonance frequency.

Figure 3:
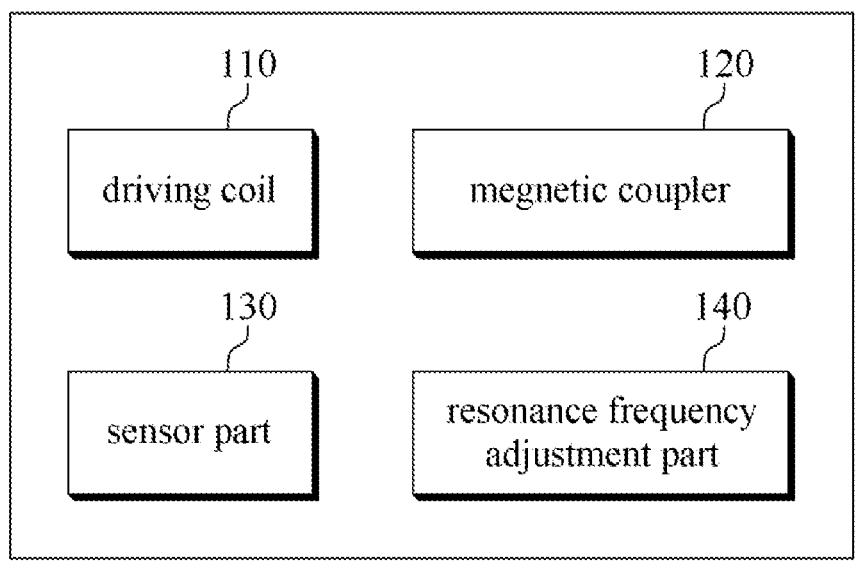
FIG. 3 is a block diagram illustrating the overall structure of a wireless power transmission apparatus according to an embodiment of the present invention.

FIG. 3 is a block diagram illustrating the overall structure of a wireless power transmission apparatus according to an embodiment of the present invention.

Referring to FIG. 3, a wireless power transmission apparatus according to an embodiment of the present invention can include a driving coil 110, a magnetic coupler 120, a sensor part 130, and a resonance frequency adjustment part 140.

The sensor part 130 may serve to detect the positions and directions of the multiple wireless power reception apparatuses, where the sensor part may detect the positions and directions of the multiple wireless power reception apparatuses based on information provided by each of the wireless power reception apparatuses. According to an embodiment of the present invention, the positions and directions of the multiple wireless power reception apparatuses can be detected based on the reception power information provided as feedback from the wireless power reception apparatuses. According to another embodiment of the present invention, the positions and directions of the wireless power reception apparatuses can also be detected by way of separate pilot signals exchanged between the wireless power transmission apparatus and the wireless power reception apparatuses.

The resonance frequency adjustment part 140 may adjust the resonance frequency of at least some of the coils forming the magnetic coupler, based on the positions of the wireless power reception apparatuses detected by the sensor part 130. As described above, the resonance frequency adjustment part 140 may adjust the resonance frequency of each coil included in the magnetic coupler by adjusting the capacitance of the variable capacitor joined to the respective coil. The resonance frequency adjustment part 140 can determine the resonance frequency using any of a variety of methods, such as those involving a preconfigured algorithm for determining the resonance frequency, lookup tables, machine learning, etc., and can perform the adjustments accordingly.

Figure 4:
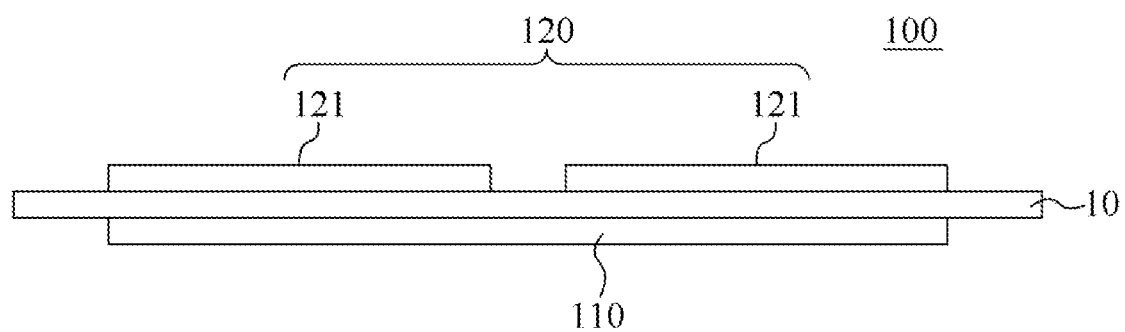
FIG. 4 is a front elevational view illustrating the arrangement structure of the driving coil and the magnetic coupler in a wireless power transmission apparatus according to an embodiment of the present invention having two coils in the magnetic coupler.

FIG. 4 is a front elevational view illustrating the arrangement structure of the driving coil and the magnetic coupler in a wireless power transmission apparatus according to an embodiment of the present invention having two coils in the magnetic coupler.

As described above, the number of coils forming the magnetic coupler can be varied, and FIG. 4 illustrates an example in which the number coils is two.

Referring to FIG. 4, the driving coil 110 of the wireless power transmission apparatus 100 may be arranged on one side of a substrate 10, while the multiple number of coils 121 forming the magnetic coupler 120 may be arranged on the other side of the substrate 10. The driving coil 110 and the magnetic coupler 120 may be arranged separated from each other, where the separated distance (e.g. the thickness of the substrate) can be determined based on the used frequency and the required transfer efficiency.

In cases where the magnetic coupler is composed of two coils, the two coils can be arranged in two regions separated along the left/right direction, and the areas of the coils forming the magnetic coupler can be similar to or smaller than the area of the driving coil.

Also, the two coils forming the magnetic coupler can be arranged on the same plane and may be arranged separated from each other.

Figure 5:
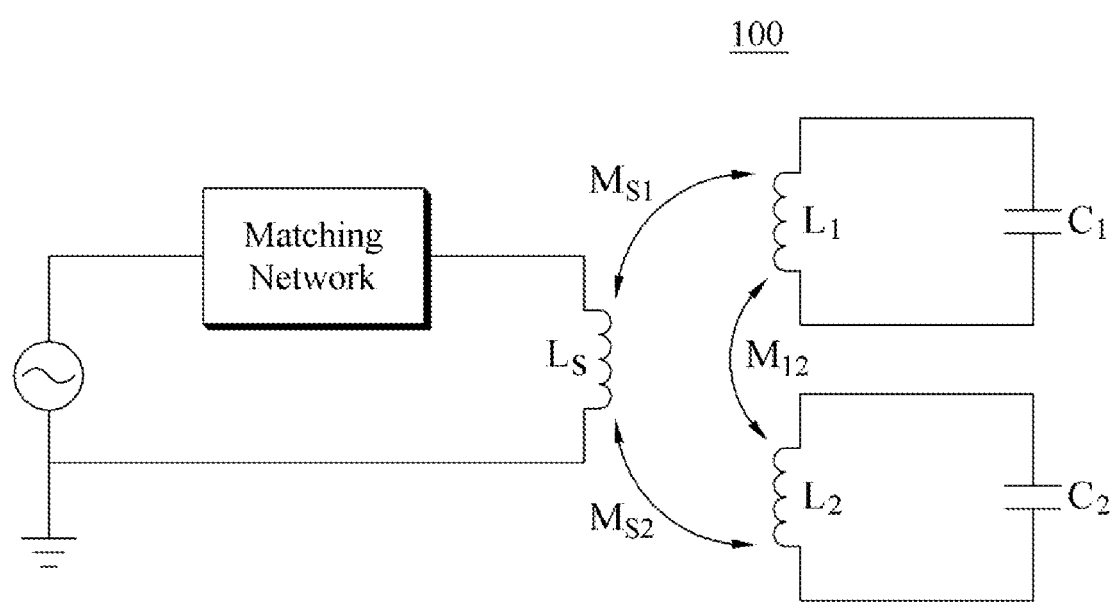
FIG. 5 illustrates a circuit diagram of a wireless power transmission apparatus according to an embodiment of the present invention.

FIG. 5 illustrates a circuit diagram of a wireless power transmission apparatus according to an embodiment of the present invention.

The circuit diagram illustrated in FIG. 5 illustrates the circuit structure in greater detail compared to the circuit diagram shown in FIG. 2, and the driving coil is marked as equivalent inductance $L_s$. The driving coil may be provided with power signals from an RF source 500.

From among the coils forming the magnetic coupler, a first coil is marked as equivalent inductance $L_1$, and a second coil is marked as equivalent inductance $L_2$. The driving coil and the coils forming the magnetic coupler may be mutually inductively coupled with inductive coupling coefficients $M_{s1}$ and $M_{s2}$. The variable capacitors adjusted by the resonance frequency adjustment part are marked as equivalent capacitance $C_1$ and $C_2$.

A matching network may be joined to the driving coil, where the matching network may perform impedance matching for the driving coil.

Figure 6:
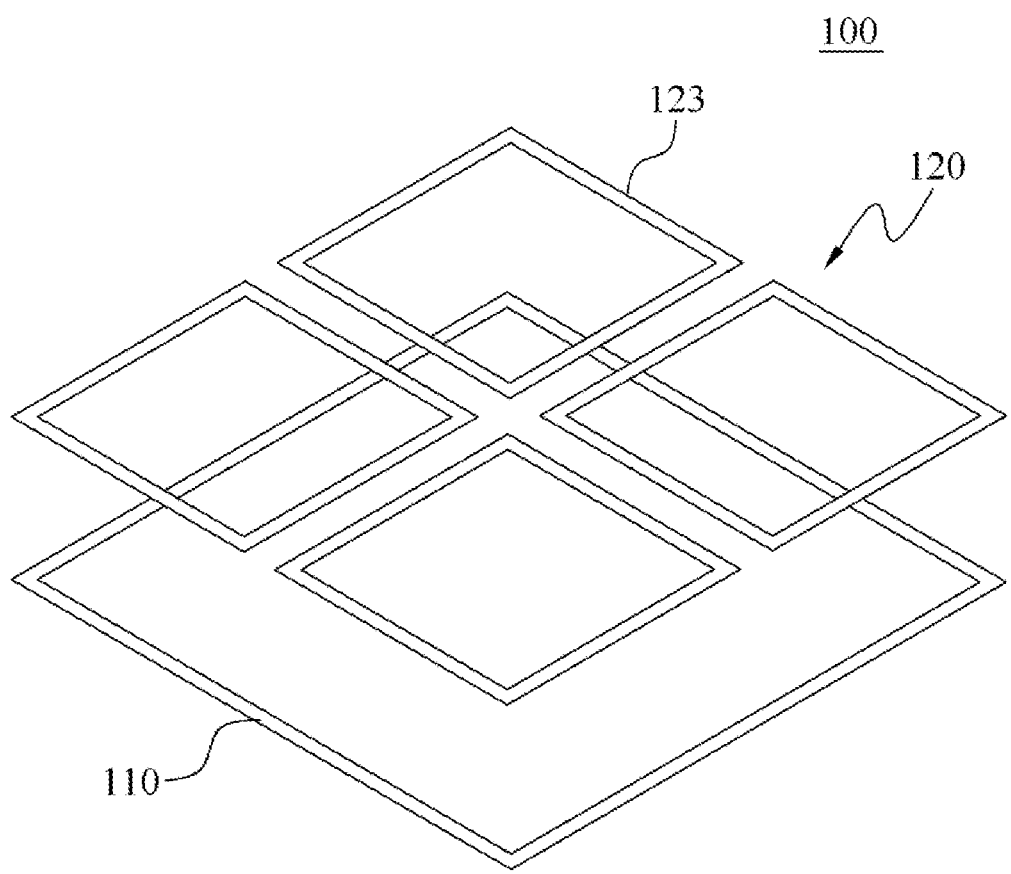
FIG. 6 illustrates the structure of a magnetic coupler composed of four coils according to an embodiment of the present invention.

FIG. 6 illustrates the structure of a magnetic coupler composed of four coils according to an embodiment of the present invention.

For the sake of greater clarity in illustrating the relationship with the driving coil, FIG. 6 omits the substrate onto which the driving coil and the magnetic coupler may be joined. In cases where four coils are used, the magnetic coupler can have the coils 123 arranged in four regions separated along the left/right direction and along the up/down direction. As in the embodiment shown in FIG. 4, the four coils may be arranged on the same plane and may be arranged separated from one another.

Although FIG. 4 and FIG. 6 illustrate cases in which each coil forming the magnetic coupler has the same area, it is also possible to configure the coils to have different areas.

The arrangements shown in FIG. 4 and FIG. 6 are merely examples of a magnetic coupler having a multiple number of coils, and it should be apparent to the skilled person that the number and arrangement of the coils can be changed as necessary.

A wireless power transmission apparatus based on an embodiment of the present invention described above can maintain efficiency even when power is distributed non-uniformly, for example due to differences in the battery capacities and current battery states of the multiple wireless power reception apparatuses.

On the other hand, a wireless power reception apparatus can also be equipped with a magnetic coupler and variable capacitors for adjusting the resonance frequencies of the multiple number of coils forming the magnetic coupler, as described above with reference to FIG. 1 through FIG. 6, in substantially the same composition as that of the wireless power transmission apparatus. In this case, the wireless power reception apparatus may include a driving coil that receives power and a magnetic coupler that is separated by a particular distance from the driving coil, and similar to the wireless power transmission apparatus described above, the magnetic coupler may include a multiple number of separated coils, with a variable capacitor joined to each coil.

The wireless power reception apparatus can also further include a sensor part, which may detect the position and direction of the wireless power transmission apparatus based on information provided from the wireless power transmission apparatus, and the adjustment of the resonance frequency can be made based on the detection information of the sensor part.

In the wireless power reception apparatus, the variable capacitors applied to the magnetic coupler can be applied in order to respond to a misaligned state caused by a horizontal deviation. As the magnetic coupler composed of multiple coils and the variable capacitor applied to each of the coils are utilized in both the wireless power transmission apparatus and the reception apparatuses together, the power transfer efficiency can be further improved. Of course, it should be apparent to the skilled person that the wireless power reception apparatus to which an embodiment of the present invention is applied is not limited thus.

While the present invention is described above by way of limited embodiments and drawings that refer to particular details such as specific elements, etc., these are provided only to aid the general understanding of the present invention. The present invention is not to be limited by the embodiments above, and the person having ordinary skill in the field of art to which the present invention pertains would be able to derive numerous modifications and variations from the descriptions and drawings above. Therefore, it should be appreciated that the spirit of the present invention is not limited to the embodiments described above. Rather, the concepts set forth in the appended scope of claims as well as their equivalents and variations are encompassed within the spirit of the present invention.

What is claimed is:

1. A wireless power transmission apparatus configured to provide charging power simultaneously to a plurality of wireless power reception apparatuses, the wireless power transmission apparatus comprising:
   a driving coil configured to transmit wireless power;
   a magnetic coupler inductively coupled with the driving coil;
   a sensor part configured to detect a position and a direction of the plurality of wireless power reception apparatuses based on information provided from the plurality of wireless power reception apparatuses;
   a resonance frequency adjustment part configured to adjust a resonance frequency of the magnetic coupler; and
   a substrate,
   wherein the magnetic coupler is arranged separate from the driving coil by a particular distance and comprises a plurality of coils, the plurality of coils are arranged on a same plane, and a variable capacitor is joined to each of the plurality of coils,
   wherein the resonance frequency adjustment part adjusts a resonance frequency of each of the plurality of coils of the magnetic coupler based on the position and direction of the plurality of wireless power reception apparatuses detected by the sensor part,
   wherein the driving coil is arranged on one side of the substrate and the plurality of coils of the magnetic coupler is arranged on the other side of the substrate, and
   wherein the separated distance between the driving coil and the plurality of coils of the magnetic coupler is determined based on used frequency and required transfer efficiency.

2. The wireless power transmission apparatus of claim 1, wherein a number of the plurality of coils included in the magnetic coupler is based on a number of simultaneously chargeable wireless power reception apparatuses.

3. The wireless power transmission apparatus of claim 1, wherein the position and direction of the wireless power reception apparatuses is detected by way of separate pilot signals exchanged between the wireless power transmission apparatus and the wireless power reception apparatuses.

4. The wireless power transmission apparatus of claim 1, wherein the information provided from the wireless power reception apparatuses include reception power information.

5. The wireless power transmission apparatus of claim 1, wherein the resonance frequency adjustment part adjusts the resonance frequency of each of the plurality of coils of the magnetic coupler by adjusting a capacitance of the variable capacitor joined to the respective coil, wherein the variable capacitor comprises a varactor diode.

6. The wireless power transmission apparatus of claim 1, wherein the resonance frequency adjustment part adjusts a capacitance of a particular variable capacitor from among the variable capacitors based on detection information of the sensor part.

7. The wireless power transmission apparatus of claim 1, wherein the variable capacitor comprises a plurality of switchable fixed capacitors.

8. A wireless power transmission apparatus configured to provide charging power simultaneously to a plurality of wireless power reception apparatuses, the wireless power transmission apparatus comprising:
   a driving coil configured to transmit wireless power;
   a magnetic coupler separated by a particular distance from the driving coil to be inductively coupled with the driving coil;
   a sensor part configured to detect a position and a direction of the plurality of wireless power reception apparatuses based on information provided from the plurality of wireless power reception apparatuses; and
   a resonance frequency adjustment part configured to adjust a resonance frequency of the magnetic coupler,
   wherein the magnetic coupler comprises a plurality of coils, the plurality of coils are arranged on a same plane, and a number of the plurality of coils included in the magnetic coupler is based on a number of simultaneously chargeable wireless power reception apparatuses,
   wherein the resonance frequency adjustment part adjusts a resonance frequency of each of the plurality of coils of the magnetic coupler based on the position and direction of the plurality of wireless power reception apparatuses detected by the sensor part, and
   wherein the driving coil is arranged on one side of a substrate and the plurality of coils of the magnetic coupler is arranged on the other side of the substrate, and the plurality of coils are arranged separated from one another on the same plane.

9. The wireless power transmission apparatus of claim 8, wherein a variable capacitor is joined to each of the plurality of coils,
  wherein the resonance frequency adjustment part adjusts the resonance frequency of each of the plurality of coils of the magnetic coupler by adjusting a capacitance of the variable capacitor joined to the respective coil.

10. The wireless power transmission apparatus of claim 8, wherein the position and direction of the wireless power reception apparatuses is detected by way of separate pilot signals exchanged between the wireless power transmission apparatus and the wireless power reception apparatuses.

11. The wireless power transmission apparatus of claim 9, wherein the variable capacitor comprises a varactor diode.

\* \* \* \* \*